United States Patent [19]
Zayhowski

[11] Patent Number: 5,095,664
[45] Date of Patent: Mar. 17, 1992

[54] OPTICAL SURFACE POLISHING METHOD

[75] Inventor: John J. Zayhowski, Pepperell, Mass.

[73] Assignee: Massachusetts Institute of Technology, Cambridge, Mass.

[21] Appl. No.: 472,100

[22] Filed: Jan. 30, 1990

[51] Int. Cl.⁵ .................. B24B 1/00; B26F 3/00
[52] U.S. Cl. .................. 51/283 R; 29/413; 29/527.2; 29/557; 51/326
[58] Field of Search ............ 437/129; 148/DIG. 92, 148/DIG. 93, DIG. 94, DIG. 95; 372/49; 29/412, 413, 414, 527.2, 527.4, 557, 558; 51/326, 327, 316–318, 383 R

[56] References Cited

U.S. PATENT DOCUMENTS

| | | | |
|---|---|---|---|
| 3,131,476 | 5/1964 | Seher | 51/235 X |
| 3,542,266 | 11/1970 | Woelfle | 225/2 |
| 4,084,354 | 4/1978 | Grandia et al. | 51/327 X |
| 4,138,304 | 2/1979 | Gantley | 51/283 R X |
| 4,783,141 | 11/1988 | Baba et al. | 350/167 |
| 4,951,291 | 8/1990 | Miyauchi et al. | 372/49 |

FOREIGN PATENT DOCUMENTS

| | | |
|---|---|---|
| 0327310 | 9/1989 | European Pat. Off. |
| 557091 | 12/1974 | Switzerland |
| 90/09688 | 8/1990 | World Int. Prop. O. |

*Primary Examiner*—D. S. Meislin
*Attorney, Agent, or Firm*—Hamilton, Brook, Smith & Reynolds

[57] ABSTRACT

A method of producing a desired surface on an optical material including producing a plurality of elements of the optical material such that each element has an upper and a lower surface, arranging the plurality of elements such that adjacent elements are separated by an interstitial material having a hardness different from the optical material being processed, processing the surfaces of the elements and removing the interstitial material.

6 Claims, 5 Drawing Sheets

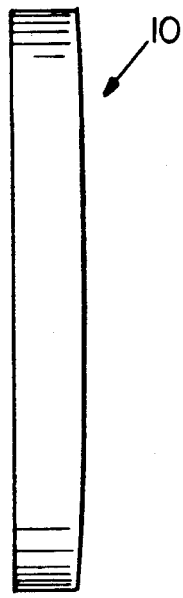
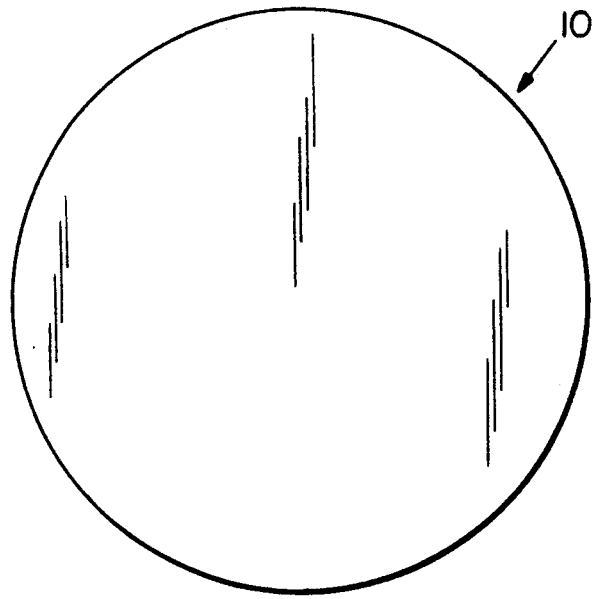
PRIOR ART
Fig. 1
PRIOR ART
Fig. 1A
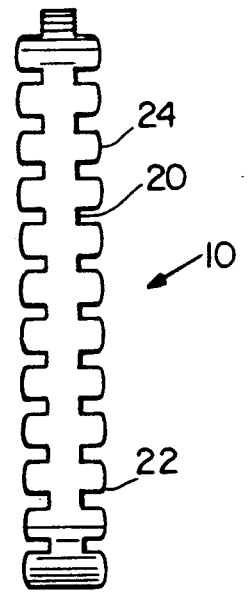
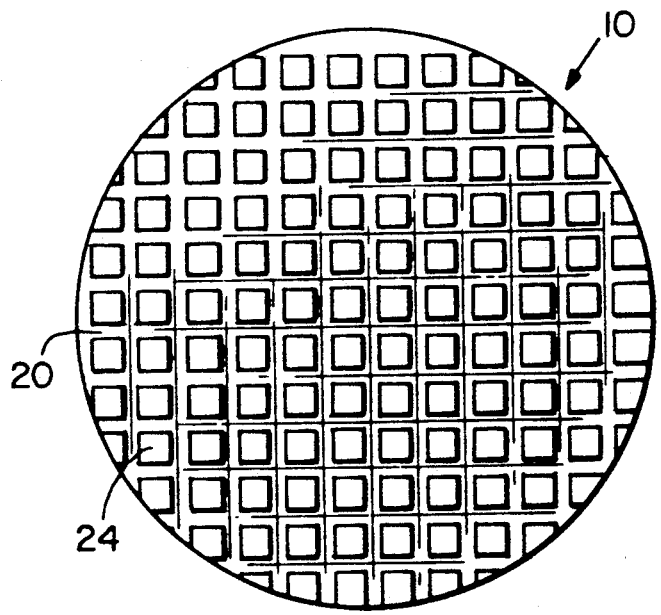
Fig. 2
Fig. 2A

OPTICAL SURFACE POLISHING METHOD

The Government has rights in this invention pursuant to Contract Number F19628-85-0002 awarded by the Department of the Air Force.

BACKGROUND OF THE INVENTION

This invention relates to forming surfaces on optical elements.

Miniature, monolithic, solid state lasers, such as the microchip laser, are produced by placing a length of gain material within a short resonant cavity. Typically, the resonant cavity is created by forming mirrored surfaces on the gain material itself. For this type of resonant cavity to be effective, the gain medium must be polished flat and parallel on two opposing sides. While such lasers can be formed if the surface of the gain medium is slightly convex, they can not be formed if the gain material has a concave surface or if the surfaces are not parallel such that shape of the gain material has the form of a wedge between the two surfaces.

Referring to FIGS. 1 and 1A, using conventional polishing techniques, a relatively restricted region can be produced on each polished wafer 10 which has the required parallelism. Towards the edges of the wafer the material becomes wedge shaped (shown exaggerated for clarity), and microchip lasers taken from that portion of the wafer do not form a proper resonant cavity with this shape. In addition, the cutting of a large wafer into sections relieves stress at the surface of the wafer, causing the sections to distort. This can cause a low yield of usable sections because the distortion tends to destroy the parallel relationship between the surfaces.

SUMMARY OF THE INVENTION

The invention provides a new and improved method of producing a desired surface on an optical material. One aspect of the method of processing includes producing a number of optical elements, arranging the elements such that adjacent elements are separated by a material having a hardness different from the optical elements being processed, processing (e.g. polishing) the surfaces of the elements and then removing the material separating the optical elements.

Preferred embodiments include the following aspects. The step of producing the elements results in decrease in stress at the surface of the elements. The step of producing the elements includes cutting elements from a boule and the step of processing includes polishing the elements to produce convex surfaces. Cutting elements from the boule includes cutting a wafer from the boule and scoring the surfaces of the wafer into a waffle pattern. The separating material between the elements may be a void caused by the scoring of the optical material. The wafer is cut into elements along the scoring.

In other preferred embodiments, elements are cut from the boule by coring to produce a plurality of rods which are embedded in a material having a hardness less than the optical material. The rods and embedding material are sliced to form a wafer. The embedding material may be an epoxy.

In still other preferred embodiments, elements cut from a boule are polished to produce concave surfaces. The elements are cut from the boule by coring to produce a number of rods of optical material which are embedded in a material having a hardness greater than the optical material. The rods and the harder material are sliced to form a wafer. The embedding of the rods in a material having a hardness greater than the optical material includes the steps of forming, from a material harder than the optical material, a die defining a volume having a number of holes large enough to accommodate the rods.

The present invention provides a method of forming large numbers of small optical elements with the desired surface curvature while they remain part of a single wafer.

Other advantages and features will become apparent from the following description of the preferred embodiment and from the claims.

DESCRIPTION OF THE PREFERRED EMBODIMENT

A more complete understanding of the invention may be obtained from the following detailed description when taken in conjunction with the drawings, in which:

FIG. 1 is a cross-sectional view of a wafer polished using the techniques known to the prior art; FIG. 1A is a plan view of the wafer of FIG. 1;

FIG. 2 is a cross-sectional view of a wafer polished using one preferred embodiment of the invention; FIG. 2A is a plan view of the wafer of FIG. 2; FIG. 2B is a cross-sectional view of individual sections of the wafer of FIG. 2A after being cut from the wafer; FIG. 2C is a plan view of the individual sections of FIG. 2B;

FIG. 3 is a flow chart of the process for manufacturing the embodiment of FIG. 2;

FIG. 4 is a cross-sectional view of a wafer created by embedding pieces of material to be polished into a matrix of a softer second material and then polishing; FIG. 4A is a cross-sectional view of a wafer created by embedding small pieces of material into a matrix of a harder second material and then polishing; FIG. 4B is a plan view of the wafers of FIGS. 4 and 4A; FIG. 4C is a perspective view of a jig with attached rods of optical material; FIG. 4D is a perspective view of die of harder material as used in FIG. 4A;

Figure 2B:
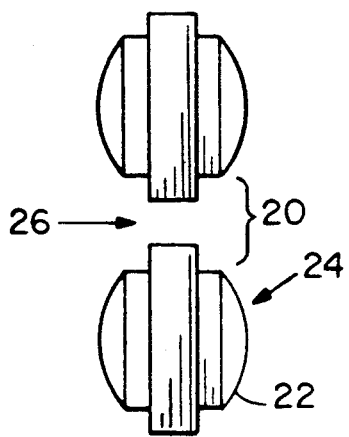
Figure 2C:
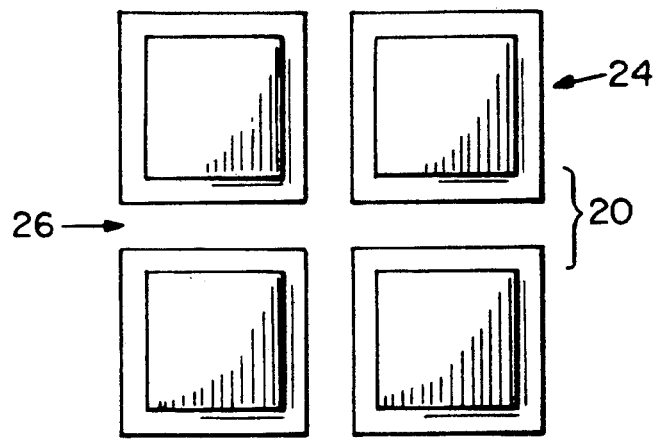
Figure 3:
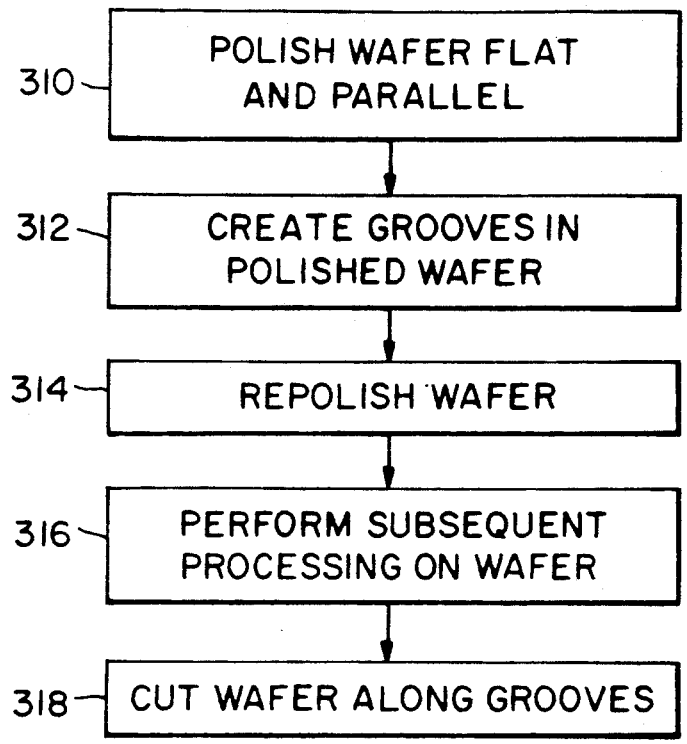
Figure 5:
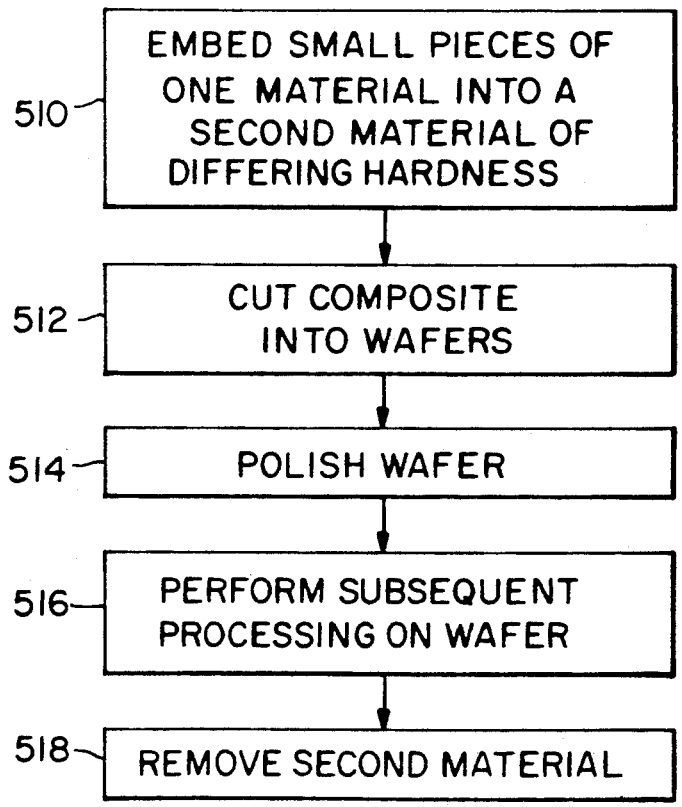
FIG. 5 is a flow chart of the process for manufacturing the embodiment of FIG. 4.

Referring to FIGS. 1, 1A, and 3, in one of the preferred embodiments, a wafer 10 of a optical material (for example a glass or crystal) to be polished is sliced from a boule of the material and is polished flat and parallel (step 310, FIG. 3) using conventional techniques. Referring also to FIGS. 2 and 2A, the wafer 10 is then inscribed with grooves 20 on one or both surfaces (step 312, FIG. 3). The depth of the grooves 20 is such that the wafer 10 can still be handled without cracking along the grooves 20. Typically, the grooves 20 are less than ¼ the thickness of the wafer 10. The grooves 20 correspond to the positions where cuts will be made to produce a plurality of smaller sections 24. The grooves 20 are wider than the width of the final cut.

After the grooves 20 are created using a diamond saw or chemical etching techniques, the wafer 10 is again polished (step 314, FIG. 3) to remove any distortion of the surface which results from the release of stress by the creation of the grooves 20. This additional polishing creates convex surfaces on each of the sections 24. The amount of convexity can be adjusted by controlling the amount of material removed. The wafer 10 then can undergo subsequent processing (step 316, FIG. 3), such as the depositing of dielectric mirrors on each of the surfaces, before being separated 26 along the grooves 20 (step 318, FIG. 3) into smaller optical elements 24, each with convex surfaces, FIGS. 2B and 2C.

Figures 4, 4A:
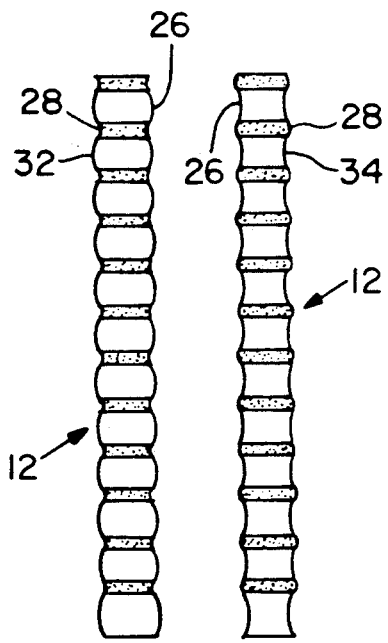
Figure 4B:
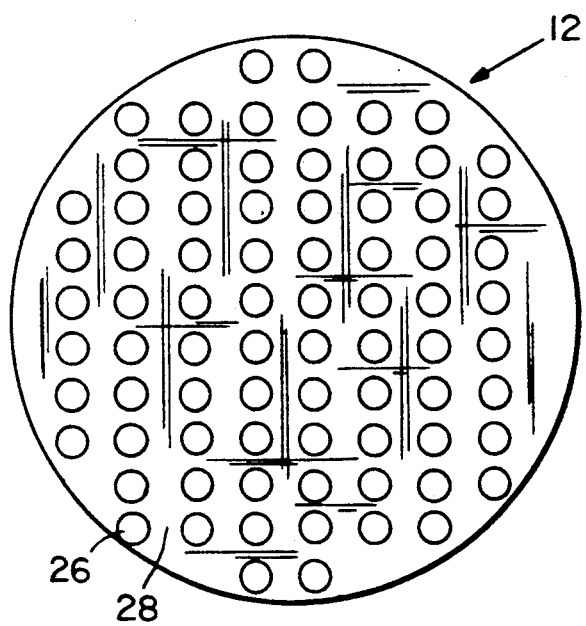

In another embodiment, referring to FIGS. 4, 4A, 4B, and 5, small pieces of the optical material 26 to be polished are embedded (step 510, FIG. 5) in a matrix of a second material 28, as in FIG. 4B. The resulting composite is then cut (step 512, FIG. 5) into wafers 12 and polished (step 514, FIG. 5). If the second material 28 is softer than the optical material 26, the optical material 26 will have a convex surface 32 after polishing, as shown in FIG. 4. If the second material 28 is harder than the optical material 26, the optical material will have a concave surface 34 after polishing, as shown in FIG. 4. The wafer 12 then undergoes subsequent processing (step 516, FIG. 5) as a wafer 12 before the second material 28 is removed (step 518, FIG. 5).

Figure 4C:
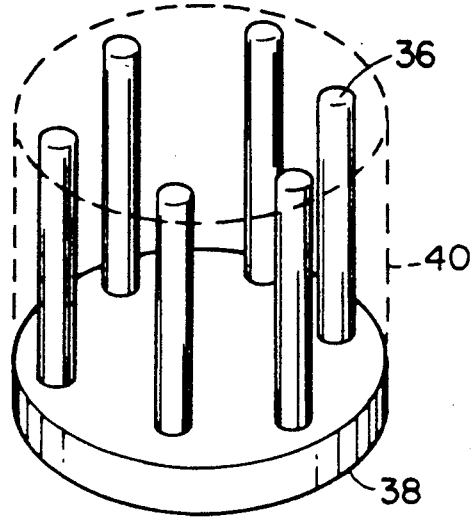

Specifically, referring to FIG. 4C, if the optical material 26 is to have a convex surface after polishing, one method of embedding the optical material 26 in a softer material 28 is to core a boule of optical material to produce a plurality of rods 36 of optical material. These rods 36 are arranged in a jig 38 in generally parallel relationship. The jig 38 forms the base of a mold (shown in phantom) 40 which is then filled with an epoxy 28. The epoxy 28 fills the interstitial space between the rods 36. Once the epoxy 28 is hardened, the composite structure of epoxy 28 and rods 26 is removed from the mold and jig and sliced into wafers 12. The wafers are then processed as previously described.

Figure 4D:
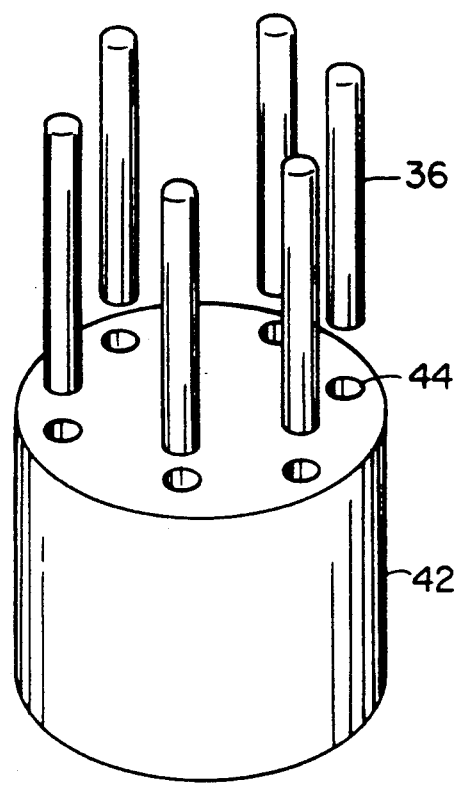

If, for some reason, a concave surface is desired, the material must be embedded in a harder material. Since, for example, crystalline optical materials are typically harder than epoxies, another method for embedding the optical material into a harder material must be used. One suitable method, FIG. 4D, is to form a die 42 from a harder material, for example, by boring a plurality of generally parallel holes 44 in a volume of the harder material, each hole being just large enough to accommodate a rod of optical material 36 to be polished. The rods 36 of optical material, produced by coring a boule, as previously described, are then inserted into the holes 44. The die 42 with inserted gain rods 36 is then sliced into wafers (step 512, FIG. 5) and processed as described previously.

Once the processing is completed, the second material 28 in each of these embodiments can be removed chemically, mechanically, or thermally, depending on the properties of the two materials used.

Figure 6:
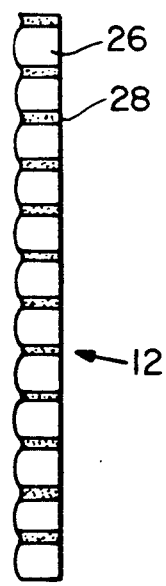
FIG. 6 is a cross-sectional view of a wafer created by embedding material to be polished into a thinner matrix of a second material and then polishing.
Figure 6A:
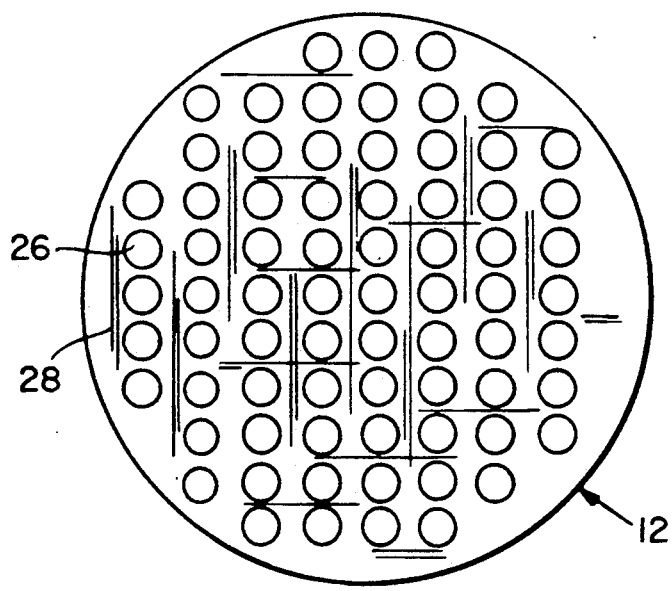
FIG. 6A is a plan view of the wafer of FIG. 6.
Figure 7:
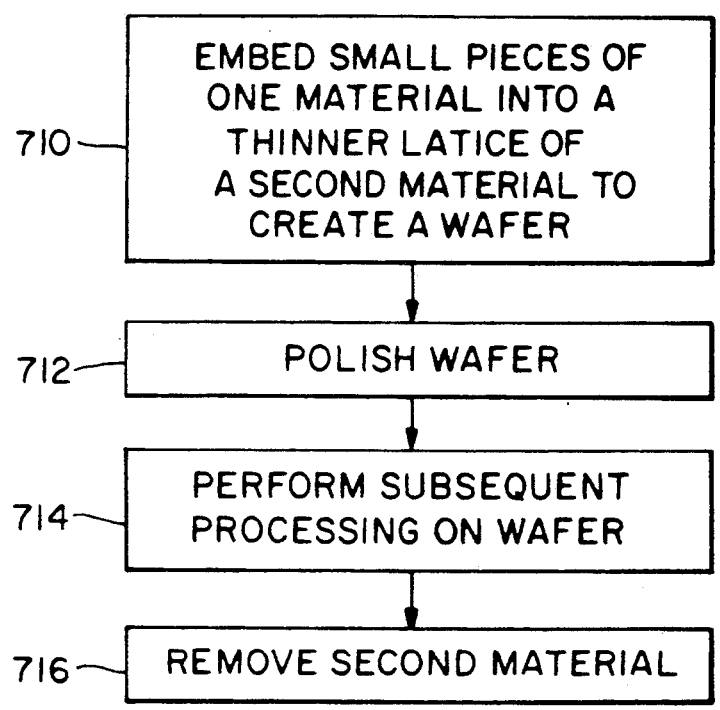
FIG. 7 is a flow chart of the process for manufacturing the embodiment of FIG. 6.

In yet another embodiment, referring to FIGS. 6, 6A and 7, a wafer 12, is created by embedding (step 710, FIG. 7) small pieces of optical material 26 in a thinner lattice of a second material 28. The resulting wafer 12 is then polished (step 712, FIG. 7) to produce a convex surface on each of the pieces of the optical material 26. The wafer 12 then undergoes subsequent processing (step 714, FIG. 7) as a wafer 12 before the second material 28 is removed (step 716, FIG. 7). Again, the second material 28 can be removed chemically, mechanically, or thermally, depending on the properties of the two materials used.

Other embodiments are within the following claims.

What is claimed is:

1. A method of producing a microchip laser comprising the steps of:
   producing a boule of gain material;
   slicing said boule into wafers;
   polishing a wafer so as to form a flat upper surface and a flat lower surface; said upper surface approximately parallel with said lower surface;
   scoring at least one said surface of said wafer into a plurality of optical elements arranged in a waffle pattern;
   polishing said scored wafer to form convex surfaces on each said element in said waffle pattern;
   cutting the wafer along the scoring to separate each said individual optical element.

2. The method of claim 1 wherein the scoring forms grooves on both of said surfaces.

3. The method of claim 2 wherein the grooves are less than one-quarter of the thickness of the wafer.

4. The method of claim 2 wherein the grooves are formed by etching.

5. The method of claim 2 wherein the grooves are formed by sawing.

6. The method of claim 1 wherein prior to separating the optical elements dielectric mirrors are formed on each surface.

* * * * *